Patented May 1, 1928.

1,668,539

UNITED STATES PATENT OFFICE.

MARKUS LARSSON, OF NIAGARA FALLS, NEW YORK, ASSIGNOR TO PHOSPHORUS HYDROGEN COMPANY, OF NEW YORK, N. Y., A CORPORATION OF MAINE.

METHOD OF REGENERATING OR REACTIVATING CATALYSTS.

No Drawing. Application filed January 11, 1926, Serial No. 80,524, and in Sweden September 29, 1925.

If phosphorus or phosphine mixed with steam in excess at a suitably elevated temperature is passed over a catalyst consisting of certain metals or metallic oxides, the phosphorus reacts with steam giving phosphoruspentoxid and hydrogen.

It is found that the activity of the catalyst in this reaction is at first somewhat increased but then it slowly decreases. This decrease of the activity seems to be due to the fact that the phosphoruspentoxid under certain conditions reacts with the metallic oxid giving a metallic phosphate which partly covers the catalyst surface and diminishes its active surface. As most of the metals in question react at least to a certain extent with steam at high temperature forming metallic oxid, it is clear that even by starting with a catalyst consisting of a metal free from oxid enough oxid will slowly be formed through the oxidizing action of the steam to make the formation of a phosphate possible.

The purpose of this invention is to regenerate the catalyst containing phosphate through a special treatment and thus restoring its activity to the normal condition.

The invention consists mainly therein that the used catalyst is heated in a current of hydrogen to a high temperature e. g. 500–700 degrees C. or more. The eventually formed phosphate is then reduced by the hydrogen forming metallic phosphide and steam which passes away with the hydrogen.

The method is suitably carried out without removing the catalyst from the reaction chamber only by shutting off the mixture of steam and phosphorus and instead passing hydrogen through same and thus reducing the phosphate to phosphide. When steam is passed over the catalyst again the metallic phosphide reacts with same forming metal or metallic oxid and phosphoruspentoxid and the catalyst has recovered its original activity.

It is not necessary that the hydrogen used for the reaction be dried but it can contain considerable amounts of moisture without any effect on the result. If the period of activation has to be extended so far that the temperature of the catalyst shows a tendency to decrease too much, this decrease of the temperature can be prevented either by preheating the hydrogen or by adding to the hydrogen a certain amount of free oxygen in the form of air or pure oxygen. The amount of oxygen should be so low that the gas mixture is not explosive.

The added oxygen reacts with a part of the hydrogen forming steam and the heat of formation from this reaction is enough to keep the catalyst at the desired temperature.

What I claim is—

1. A method of regenerating or reactivating catalysts used in decomposing steam by phosphorus, characterized by treatment of the used catalyst which has a coating of phosphate character thereon with hydrogen at such an elevated temperature that the phosphatic coating is reduced.

2. A method of regenerating or reactivating catalysts used in decomposing steam by phosphorus which comprises in reactivating the catalyst within the reaction chamber itself by shutting off the supply of phosphorus and steam and in passing hydrogen through the reaction chamber in place of the phosphorus and steam.

3. A method of reactivating catalysts as set forth in claim 2 in which a small quantity of oxygen is mixed with hydrogen.

4. A method of regenerating or reactivating catalysts used in decomposing steam by phosphorus characterized in the treatement of the used catalyst which has a coating of phosphate character thereon with hydrogen at such an elevated temperature that the coating of phosphate is reduced to phosphide.

5. A method of regenerating or reactivating catalysts used in decomposing steam by phosphorus which consists in passing hydrogen at elevated temperatures of from substantially 500° to 700° C. over the used catalyst to revivify and reactivate the same.

6. A method of regenerating or reactivating catalysts used in decomposing steam by phosphorus which consists in passing hydrogen at such temperatures over the spent catalyst that its deleterious coating is converted into a substance of such character that it can itself be reacted upon by the steam upon the reinitiation of the decomposition of steam by phosphorus.

7. A method of regenerating or reactivating catalysts used in decomposing steam by phosphorus, which consists in passing hydrogen at such temperatures over the spent catalyst that its deleterious coating is converted into a substance of such character which will not impede the phosphorus steam reaction.

In testimony whereof I hereto affix my signature.

MARKUS LARSSON.